(12) United States Patent
Fink et al.

(10) Patent No.: US 12,059,757 B2
(45) Date of Patent: Aug. 13, 2024

(54) WELDING COMPONENT COOLING SYSTEM FOR COOLING A WELDING COMPONENT

(71) Applicant: FRONIUS INTERNATIONAL GMBH, Pettenbach (AT)

(72) Inventors: Reinhold Fink, Pettenbach (AT); Sebastian Licht, Pettenbach (AT); Andreas Leonhartsberger, Pettenbach (AT); Peter Brandlmayr, Pettenbach (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 0 days.

(21) Appl. No.: 18/287,232

(22) PCT Filed: Jun. 29, 2022

(86) PCT No.: PCT/EP2022/067824
§ 371 (c)(1),
(2) Date: Oct. 17, 2023

(87) PCT Pub. No.: WO2023/275107
PCT Pub. Date: Jan. 5, 2023

(65) Prior Publication Data
US 2024/0198448 A1    Jun. 20, 2024

(30) Foreign Application Priority Data
Jun. 30, 2021    (EP) ..................................... 21182634

(51) Int. Cl.
*B23K 9/26*    (2006.01)
(52) U.S. Cl.
CPC ..................................... *B23K 9/26* (2013.01)

(58) Field of Classification Search
CPC .... B23K 26/703; B23K 26/082; B23K 26/32; B23K 26/24; B23K 26/28; B23K 26/22;
(Continued)

(56) References Cited

U.S. PATENT DOCUMENTS 4,405,853 A    9/1983    Klein
4,560,856 A *  12/1985    Miller ................ B23K 26/0673
                                                    219/121.63
(Continued)

FOREIGN PATENT DOCUMENTS

CN    101438442 A    5/2009
CN    103928840 A    7/2014
(Continued)

OTHER PUBLICATIONS

International Search Report in PCT/EP2022/067824, mailed Oct. 13, 2022.
European Search Report dated Jan. 3, 2022 in European Application No. 21182634.2, with English translation of the relevant parts.
Chinese Office Action in Chinese Patent Application No. 202280016888.0 issued Mar. 16, 2024 with English translation.

*Primary Examiner* — Phuong T Nguyen
(74) *Attorney, Agent, or Firm* — Collard & Roe, P.C.

(57) ABSTRACT

A welding component cooling system for cooling a welding component, in particular a welding torch, includes at least one container for cooling liquid, a cooling circuit with corresponding cooling lines, at least one pump arranged in the cooling circuit for conveying the cooling liquid through the cooling lines in the cooling circuit, at least one heat exchanger arranged in a cooling line, and a device for deionizing the cooling liquid in the cooling circuit. Also a welding component, in particular a welding torch includes such a welding component cooling system. At least one sensor for measuring the conductance of the cooling liquid is arranged in the cooling circuit and is connected to a (Continued)

control device, wherein the control device can be connected to a welding current source connected to the welding component.

12 Claims, 8 Drawing Sheets

(58) Field of Classification Search
CPC .......... B23K 26/0622; B23K 2101/18; B23K 2101/006; B23K 26/323; B23K 26/044; B23K 2203/04; B23K 26/26; B23K 26/244; B23K 26/14; B23K 31/125; B23K 26/20; B23K 26/0066; B23K 26/0626; B23K 26/073; B23K 26/38; B23K 26/0619; B23K 26/0624; B23K 26/53; B23K 26/0006; B23K 26/0676; B23K 26/0861; B23K 2103/56; B23K 2101/40; B23K 9/26
USPC .......... 219/121.63, 121.64, 121.72, 136, 119
See application file for complete search history.

(56) References Cited

U.S. PATENT DOCUMENTS

| 2004/0028963 | A1 | 2/2004 | Kormann et al. |
| 2009/0068521 | A1 | 3/2009 | Buchinger et al. |
| 2010/0276397 | A1 | 11/2010 | Luce |
| 2021/0078115 | A1 | 3/2021 | Rose et al. |

FOREIGN PATENT DOCUMENTS

| EP | 0 072 407 A2 | 2/1983 |
| EP | 2 025 029 B1 | 12/2011 |
| EP | 3 501 719 A1 | 6/2019 |
| JP | 559-17617 A | 1/1984 |
| JP | 2003346845 A | 12/2003 |
| JP | 2005345076 A | 12/2005 |
| WO | 01/07193 A1 | 2/2001 |

* cited by examiner

WELDING COMPONENT COOLING SYSTEM FOR COOLING A WELDING COMPONENT

CROSS REFERENCE TO RELATED APPLICATIONS

This application is the National Stage of PCT/EP2022/067824 filed on Jun. 29, 2022, which claims priority under 35 U.S.C. § 119 of European Application No. 21182634.2 filed on Jun. 30, 2021, the disclosure of which is incorporated by reference. The international application under PCT article 21(2) was not published in English.

The invention relates to a welding component cooling system for cooling a welding component, in particular a welding torch, comprising at least one container for cooling liquid, a cooling circuit with corresponding cooling lines, at least one pump arranged in the cooling circuit for conveying the cooling liquid through the cooling lines in the cooling circuit, and at least one heat exchanger arranged in a cooling line, wherein the cooling circuit is equipped with a device for deionizing the cooling liquid.

The invention also relates to a welding component, in particular a welding torch, having a welding component cooling system mentioned above.

The present invention relates to welding components or the cooling thereof, in particular to inert gas welding components.

Liquid cooling systems for welding devices usually consist of a pump, a cooling liquid, a cooling line, the welding components to be cooled, a container for the cooling liquid, a heat exchanger, and optionally a filter, a flow monitor and a device for measuring the temperature of the cooling liquid. The cooling liquids used are mostly based on water mixed with various additives. These cooling liquids typically have an electrical conductivity of 80-120 µs/m.

The cooling lines and cooling channels of the cooling circuit are usually made of different materials. In the case of electrically conductive materials such as metals and/or metal alloys, different materials show different standard potentials of the electrochemical voltage series. In addition, individual or even more than one component in the cooling circuit can have a voltage applied to them selectively or non-selectively and thus be at different electrical potentials (contact tube path/gas nozzle path). The resulting voltage between components of a welding component made of electrically conductive materials can lead to an electrochemical current flow through the cooling liquid. Furthermore, concentration gradients of ions in the cooling liquid can occur, which also promote the formation of an electrochemical element. As a result, the component gradually breaks down at the plus potential (sacrificial anode). Among other things, the rate of breakdown is proportional, inter alia, to the conductivity of the cooling liquid. The electrochemical current flow not only breaks down the anode and thus destroys the respective welding component, but the resulting anode sludge can also clog the cooling line and thus reduce or even prevent the cooling effect. As more and more ions accumulate in the cooling liquid as a result of the electrochemical oxidation process, the conductivity of the cooling liquid increases steadily s or can transition to saturation and the process can, in some cases, continuously perpetuate itself. Furthermore, the released ions have a strongly chemically catalytic effect, which promotes a decomposition of the cooling liquid into poorly soluble, and thus clogging, substances.

To reduce the electrical conductivity of a cooling liquid, in various technical domains it is common to use deionizers, which remove the ions from the cooling liquid with the aid of a deionizing resin. For example, document EP 0 072 407 A2 describes a plasma spraying device with a deionizer in the cooling system, which can extend the service life of the plasma nozzle.

The use of an ion exchange resin unit for deionizing the cooling liquid in a fuel cell is described, for example, in EP 2 025 029 B1.

U.S. Pat. No. 4,560,856 A describes a laser processing machine with a liquid cooling system using a device for deionizing the cooling liquid. A similar liquid cooling system in a plasma spraying machine has been disclosed in U.S. Pat. No. 4,405,853 A.

A liquid cooling system has been disclosed in JP S59 17617 A, in which the pH value and the temperature of the cooling liquid are measured and, depending on the measured values, a device for deionizing the cooling liquid is controlled accordingly.

A welding component with a liquid cooling system has been disclosed in EP 3 501 719 A1. A device for deionizing the cooling liquid is not described.

In cooling systems of welding systems, the use of devices for deionizing the cooling liquid has not yet been disclosed.

The object is therefore to create a welding component cooling system as well as a welding component having such a welding component cooling system, which ensure an optimal cooling of the welding component over a maximum possible length of time so that a maximum possible lifetime of the components of the welding component can be achieved. The cooling liquid used should be able to be used for as long as possible and the cooling circuit should be prevented from becoming clogged. Disadvantages of known welding component cooling systems should be reduced or even eliminated.

The object according to the invention is achieved by an aforementioned welding component cooling system, in which at least one sensor for measuring the conductivity of the cooling liquid is arranged in the cooling circuit and connected to a control device, wherein the control device can be connected to a welding current source connected to the welding component. The deionizing device located in the cooling circuit ensures that the conductivity of the cooling liquid remains low, so that the disadvantages described above due to the rapid destruction of metallic components of the respective welding component due to the electrochemical oxidation process and the resulting reduced service life of the welding component, as well as the contamination of the cooling liquid and possible blockage of the cooling circuit, do not occur or do not occur so rapidly. In the cooling circuit therefore, at least one deionizing device is arranged, which causes a desalination of the cooling liquid. The resulting reduction in the conductivity of the cooling liquid reduces the electrochemical corrosion of the metallic components or preferably stops it entirely and drastically increases the service life of the welding components and/or their components.

The condition of the cooling liquid can be examined by means of the at least one sensor for measuring the conductivity of the cooling liquid in the cooling circuit, and appropriate warnings can be issued, or automatic control processes can be carried out when specific conductivity values are found. When a predetermined conductivity limit is reached, this may, for example, be an indication of saturation of the mixed-bed resin of the deionizing device. Accordingly, a control device and a display of the welder can be used to induce a change in the mixed-bed resin. In this case, a simple replacement capability of the deionizing device can be provided, for example, by means of a screw connection, a click-on connection, or a bayonet connection. Instead of a dedicated display, the display on the welding current source or on a higher-level control device can also be used, which is connected to the at least one conductivity sensor via corresponding connecting cables. Both wired and wireless connections are possible. For example, the following limits can be defined for the conductance value of the cooling liquid:

>50 µs "red zone" (high electrochemical oxidation potential—replacement of deionizing device or mixed-bed resin necessary)

25 to 50 µs "orange zone" (average electrochemical oxidation potential—plan maintenance of the deionizing device)

10 to 25 µs "yellow zone" (low electrochemical oxidation potential)

<10 µs "green zone" (no significant electrochemical oxidation potential)

At least one sensor for measuring the conductivity of the cooling liquid is preferably arranged in a return cooling line of the cooling circuit. By always ensuring that the coolant has a very low conductance, the "insulating" effect of the cooling liquid is ensured. This reduces the risk of components of the welding component that could be touched by the welder, such as the gas nozzle, being at a dangerously high potential like that of other components, such as the contact tube. Likewise, the "insulating" or very poorly conducting cooling liquid can prevent the RF ignition energy from being diverted to other parts of the welding components and ensure that essentially all the ignition energy arrives at the welding component electrode and causes the ignition of the arc.

The at least one sensor for measuring the conductivity of the cooling liquid is connected to a control device. The control device, which can be formed, for example, by a microprocessor, processes the data accordingly and forwards it to the desired higher-level stations. The control device is preferably connected to a display to be able to visually display operating states of the welding component cooling system to the user. The display can range from simple light sources, in particular light emitting diodes, through simple displays to more complex touch screens, which simultaneously enable an operating function. The display can also be used to present, for example, the respective state of the deionizing device, the conductance value, flow rate and/or temperature of the cooling liquid, etc. in different colours, numerical values or even in the form of indicators. If certain limits are exceeded, in addition to visual warnings, acoustic signals can of course also be output via a loudspeaker or the like and/or forwarded to higher-level control stations. Because the control device can be connected to a welding current source connected to the welding component, the welding current source can be used to display or process the relevant information and no separate control device, or at least no display, must be provided.

Welding components include mainly the welding torch, but also the hose package through which the cooling liquid is passed in appropriate lines, the pump for conveying the cooling liquid, etc. Due to the welding component cooling system according to the invention and the reduced conductance of the cooling liquid, materials can be used for some of the welding components or their components, which would cause destruction in a very short time if used in conventional cooling liquids without the present invention. The effort and costs involved in implementing the deionizing device in the cooling circuit are manageable and will be amortized relatively quickly due to the longer service life of the welding components achieved.

Preferably, the deionizing device is formed by a container with mixed-bed resin arranged in it. This is a simple and cost-effective way to implement a device for deionizing the cooling liquid. The mixed-bed resin, which is available at very reasonable cost, is placed in a container through which the cooling liquid flows, resulting in desalination of the cooling liquid. The resin binds the free ions in the cooling liquid, thereby reducing the conductivity of the cooling liquid depending on its quantity and placement. For example, conductance values of the cooling liquid on the order of 1-50 ρs/m can be achieved. The ion exchanger formed by the mixed-bed resin is suitable for "capturing" or storing (metal) ions and replacing them with H+ or OH ions, which subsequently combine to form neutral water. Suitable materials for mixed-bed resins are in particular OH– and H+ ion-activated resins, for example Purolite® MB400, universal mixed-bed resins or selective mixed-bed resins, which can also be mixed with each other in any proportion and can have different grain sizes. Reprocessing of the mixed-bed resins is not provided. The mixed-bed resin may be arranged in a liquid-permeable pouch or container similar to a tea bag.

The mixed-bed resin arranged in the container of the deionizing device can ideally consist of a mixture of cation resin and anion resin, preferably 40% cation salt and 60% anion salt. The mixing ratio between anion salt and cation salt is usually chosen in such a way that the service life of the mixed-bed resin is maximized.

The deionizing device may be arranged in a cooling line within the cooling circuit. This means that the cooling liquid flows through the deionizing device, thereby deionizing the cooling liquid and reducing its conductance.

Alternatively, the deionizing device may also be arranged in a bypass to a cooling line within the cooling circuit. Compared to the arrangement described above directly in the cooling circuit, this has the advantage that the deionizing device does not increase the flow resistance for the cooling liquid in the cooling circuit, but the conductance of the cooling liquid can nevertheless be reduced accordingly.

According to one feature of the invention, the container with the mixed-bed resin has a central inlet channel and an external outlet channel coaxial to it. The cooling liquid can either flow through the mixed-bed resin and/or only flow past the mixed-bed resin in contact with the surface. This design ensures an optimal interaction between the mixed-bed resin arranged in the container and the cooling liquid while at the same time minimizing the flow resistance for the cooling liquid.

Furthermore, at least one sensor for measuring the flow rate of the cooling liquid can be arranged in the cooling circuit, which can be used to obtain important information about the flow of the cooling liquid. The measured flow values of the cooling liquid can be used either for documentation or monitoring purposes or also to control specific processes. The above-mentioned sensor for measuring the conductance of the cooling liquid can also be combined in a particularly preferred manner with the sensor for measuring the flow rate of the cooling liquid and can be placed at one or more locations in the cooling circuit. Such combined sensors for both properties of the cooling liquid are relatively inexpensive and available in a small size.

The temperature of the cooling liquid in the cooling circuit can be detected via at least one temperature sensor. Of course, the cooling effect can be measured via the temperature of the coolant and appropriate steps can be taken. The measured temperature of the cooling liquid can be used either for documentation or monitoring purposes or for controlling specific processes. The above-mentioned sensor for measuring the conductance of the cooling liquid and sensor for measuring the flow rate of the cooling liquid can also be combined in a particularly preferred manner with the sensor for measuring the temperature of the cooling liquid and can be placed at one or more locations in the cooling circuit. Such combined sensors for all of the above properties are relatively inexpensive and available in a small size.

The at least one sensor for measuring the flow rate of the cooling liquid and/or the at least one temperature sensor for measuring the temperature of the cooling liquid or a suitable combination sensor can also be connected to the control device. Instead of a dedicated control device for this purpose, an already existing control device, for example in a welding current source, can of course also be used. The only prerequisite for this is a corresponding wired or wireless connection of the respective sensors to this control device and a guaranteed supply of electrical energy to the sensors.

As a cooling liquid, water with additives, for example an antifreeze, in particular ethanol or propylene glycol or ethylene glycol or general water-soluble alcohols s and/or general water-soluble polyalcohols, and/or or a corrosion inhibitor, is preferably provided. In addition, algaecides and/or fungicides may be added to the cooling liquid.

If at least one filter is arranged in the cooling circuit, contaminants in the cooling liquid can be removed. The filters can be formed, for example, by metal screens, plastic screens, paper or natural fibre filters, felts, nonwovens, open-pored sintering materials, bulk materials or combinations thereof. If the coolant flow rate falls below a specified limit, this may indicate a higher degree of contamination of the filter and may require replacement or cleaning of the filter.

The object according to the invention is also achieved by an above-mentioned welding component, in particular a welding torch, in which a welding component cooling system described above is provided, the cooling circuit of which is connected to the cooling channel of the welding component, or wherein the cooling channel of the welding component is part of the cooling circuit of the welding component cooling system. The use of the cooling system according to the invention ensures that the cooling liquid has the lowest possible conductance value and thus the electrochemical oxidation is avoided or reduced. For further advantages, reference is made to the above description of the welding component cooling system. According to the invention, due to the low conductance of the cooling liquid, different materials with a difference in the electrochemical potential greater than 0.7 V can be used in a welding component, in particular a welding torch. The service life is not reduced by the low electrochemical current flow, due to the low conductance of the cooling liquid.

As mentioned above, achieving the very low conductance of the cooling liquid allows the use of metals and combinations thereof which would otherwise lead to rapid destruction of the components. Whereas, for example, conventional welding component cooling systems, in which the cooling liquid has relatively high electrical conductance values, comprise components made of electrically conductive materials with a similar standard potential according to the electrochemical voltage series, when using the welding component cooling system according to the invention, combinations of materials with a significantly higher difference in the standard potential according to the electrochemical voltage series can also be used. For example, while maintaining the required service life, conventional water-cooled welding components could only be combined with metals with a maximum of 0.58 V difference in standard potential, for example the use of copper (standard potential+0.35 V) and nickel (standard potential −0.23 V). When using the welding component cooling system according to the invention, however, the combination of metals with a difference of up to 2.46 V in standard potential is possible, for example, while maintaining the required service life. Here, for example, aluminium (standard potential −1.66V) can be combined with silver (standard potential+0.8V), thereby achieving a significantly longer service life of the welding component, in particular the welding torch.

According to a further feature of the invention, it is provided that the at least two components of the welding component with different electrochemical standard potential are arranged in such a way that the minimum path length or the liquid column length between the at least two components through the cooling channel is less than 12 mm, preferably than 5 mm. In welding components with conventional cooling systems with conductance values of the cooling liquid between 50 and 250 µs, the requirement, for example, consists in designing the liquid column length to be >12 mm in order to maintain an acceptable electrochemical removal rate. When using the cooling system according to the invention with conductance values of the cooling liquid below 10 µs, however, liquid column lengths of <5 mm are sufficient to achieve an acceptable electrochemical removal rate. As a result, some welding components can also be designed more compact or lighter.

The present invention is explained in more detail by reference to the accompanying drawings, to which it is not intended to be limited. Shown are.

Figure 1:
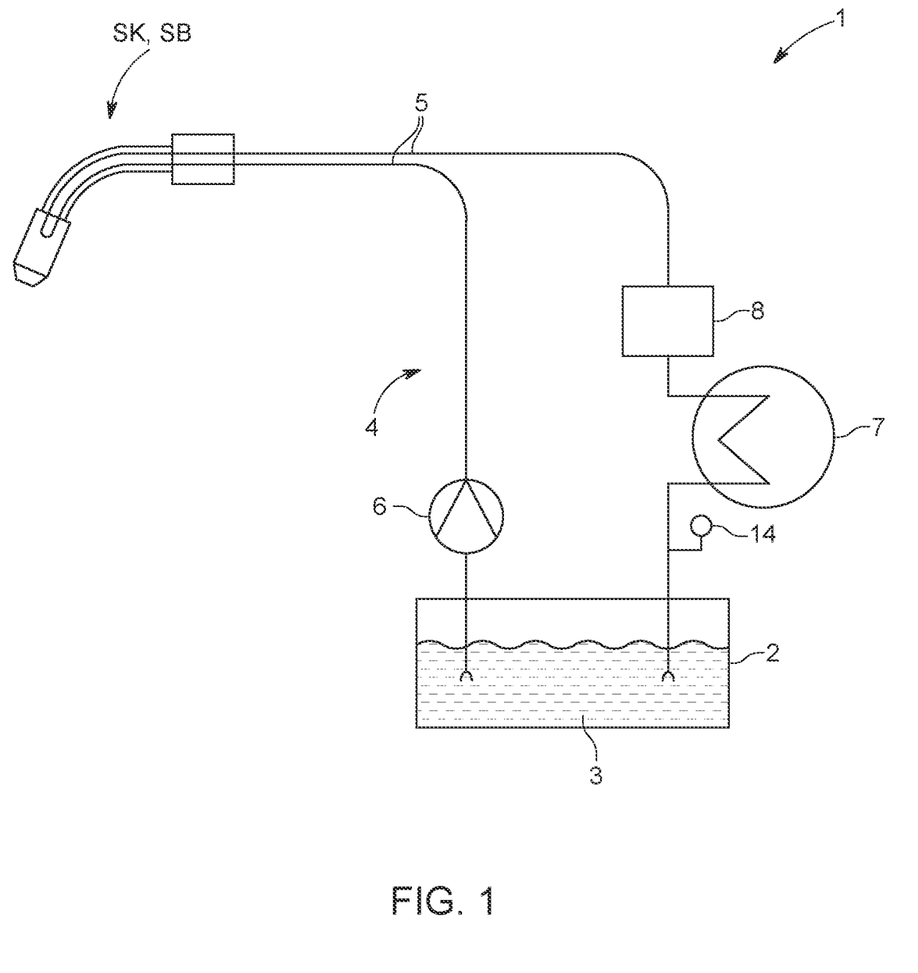
FIG. 1 a schematic block diagram of an embodiment of a welding component cooling system according to the invention.

FIG. 1 shows a schematic block diagram of an embodiment of a welding component cooling system 1 according to the invention. The welding component cooling system 1 for cooling a welding component SK, for example a welding torch SB, contains at least one container 2 for the cooling liquid 3. The cooling liquid 3 is formed in particular by water with appropriate additives, which is conveyed from the container 2 in a cooling circuit 4. The cooling circuit 4 is formed by corresponding cooling lines 5. At least one pump 6 arranged in the cooling circuit 4 conveys the cooling liquid 3 through the cooling lines 5 in the cooling circuit 4. Within the cooling circuit 4, in a cooling line 5 at least one heat exchanger 7 is arranged, via which the heat is dissipated to the environment. The heat exchanger 7 can be designed, for example, as a liquid/air heat exchanger or also as a liquid/liquid heat exchanger. The waste heat can be reused if necessary, for example to heat the welding hall. In order to prevent the electrical conductivity S of the cooling liquid 3 from becoming too high, according to the invention a device 8 for deionizing the cooling liquid 3 is provided in the cooling circuit 4. In the illustrated exemplary embodiment, the deionizing device 8 is arranged in the return cooling line 5 of the cooling circuit 4. However, it can also be placed at a different position within the cooling circuit 5.

Figure 3A:
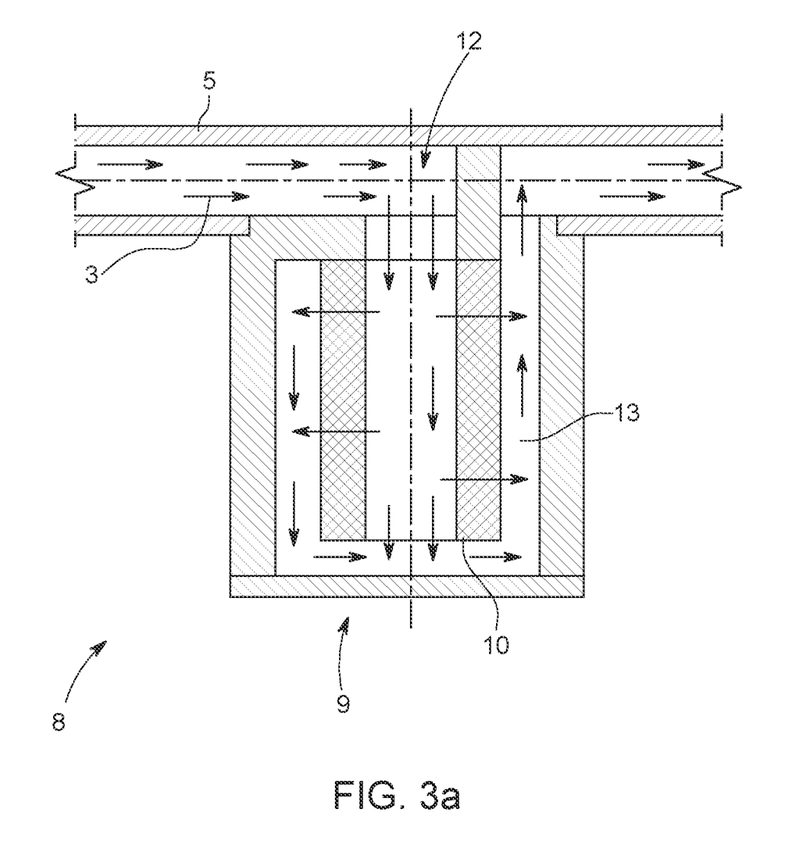
FIG. 3a a first embodiment of a device for deionizing the cooling liquid in the form of a container with mixed-bed resin arranged therein.

The deionizing device 8, which can be formed, for example, by a container 9 with mixed-bed resin 10 arranged therein (see FIG. 3), ensures that the cooling liquid 3 has a very low electrical conductance S, which means that negative effects due to electrochemical oxidation occurring in the welding components SK are less pronounced and consequently the welding components SK have a longer service life.

Advantageously, at least one sensor 14 for measuring the conductance S of the cooling liquid 3 is arranged in the cooling circuit 4, in particular in a return cooling line 5 of the cooling circuit 4. The condition of the cooling liquid 3 can be monitored and the effect of the deionization by the deionizing device 14 can be measured via the measured values of the sensor 8 obtained for measuring the conductance S of the cooling liquid 3.

Instead of a sensor 14 for measuring the conductivity S of the cooling liquid 3 in the cooling circuit, a sensor for measuring the resistance of the welding component SK to ground, for example, the resistance of the contact tube to ground, can also be provided used to infer the conductance value S of the cooling liquid 3 depending on the welding torch used.

Figure 2:
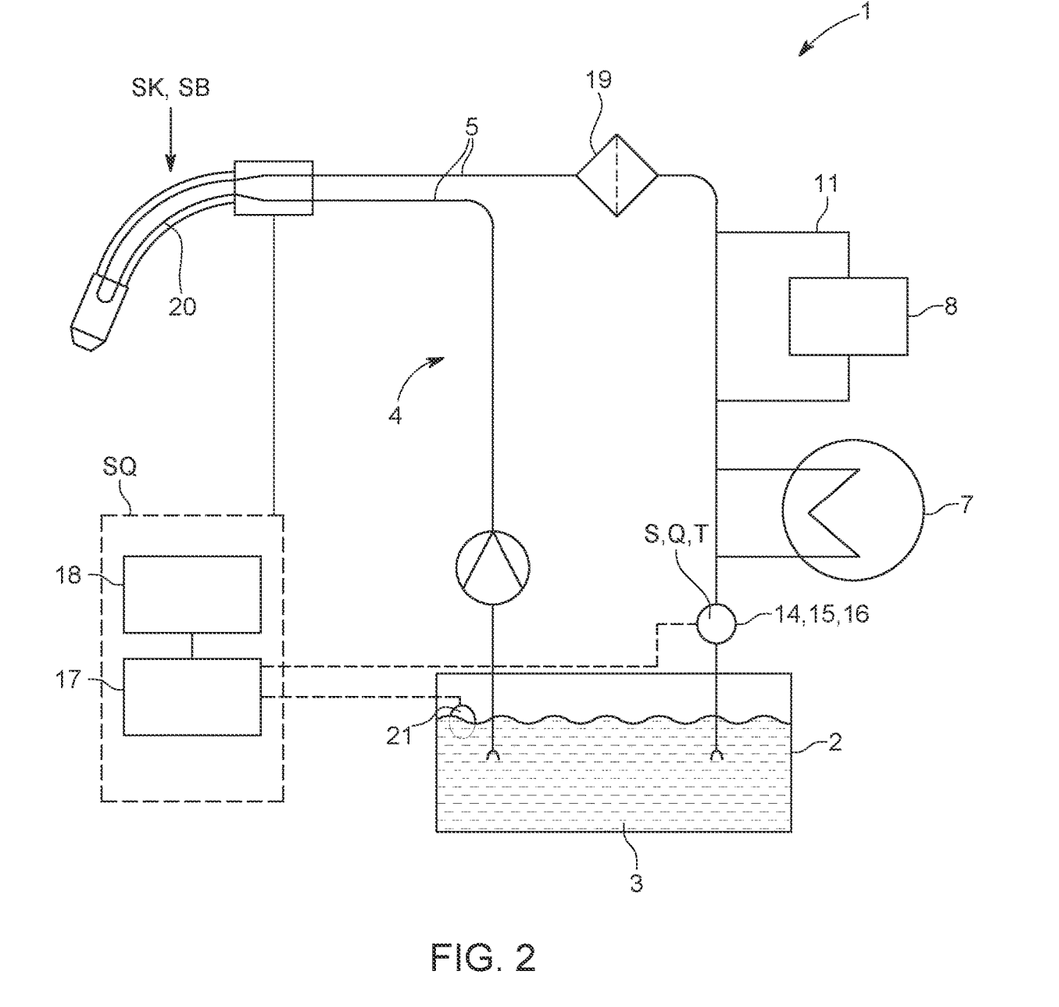
FIG. 2 a schematic block diagram of a further embodiment of a welding component cooling system according to the invention.

FIG. 2 shows a schematic block diagram of a further embodiment of a welding component cooling system 1 according to the invention. In contrast to the embodiment according to FIG. 1, the device 8 for deionizing the cooling liquid 3 is not arranged in a cooling line 5 of the cooling circuit 4, but in a bypass 11 to a cooling line 5 within the cooling circuit 4. As a result, the flow resistance of the cooling liquid 3 within the cooling circuit 5 is not adversely affected by the deionizing device 8. Furthermore, in addition to the sensor 14 for measuring the conductivity S of the cooling liquid 3, at least one sensor 15 for measuring the flow rate Q of the cooling liquid 3 and at least one temperature sensor 16 for measuring the temperature T of the cooling liquid 3 are arranged in the cooling circuit 4. In the illustrated exemplary embodiment, the sensors 14, 15, 16 are arranged at the same location within the cooling circuit 4 and preferably formed by a combined sensor.

The at least one sensor 14 for measuring the conductivity S of the cooling liquid 3, the at least one sensor 15 for measuring the flow rate Q of the cooling liquid 3, and/or the at least one temperature sensor 16 for measuring the temperature T of the cooling liquid 3 and an optional sensor 21 for measuring the level of the cooling liquid 3 in the container 2 are preferably connected to a control device 17, which ensures the processing and transmission of the measured values. A display 18 connected to the control device 17 can display the measured values of the sensors 14, 15, 16, 21 and the condition of the deionizing device 8. The control device 17 and the display 18 can also be arranged in a welding current source SQ. The connections between the control device 17 and the sensors 14, 15, 16, 21 may be formed by wires or also be implemented wirelessly.

At least one filter 19 for filtering the cooling liquid 3 can also be arranged in the cooling circuit 4.

FIG. 3a shows an embodiment of a device for deionizing 8 of the cooling liquid 3 in the form of a container 9 containing mixed-bed resin 10. The container 9 with the mixed-bed resin 10 that is accordingly connected to the cooling lines 5 of the cooling circuit 4 has a central inlet channel 12 and an external outlet channel 13 coaxial thereto. The cooling liquid 3 can either flow through the mixed-bed resin 10 and/or only flow past the mixed-bed resin 10 in contact with the surface. The mixed-bed resin 10 can be replaced in a simple manner, preferably from the underside of the container 9. The mixed-bed resin 10 preferably consists of a mixture of cation resin and anion resin, in particular 40% cation salt and 60% anion salt.

Figure 3B:
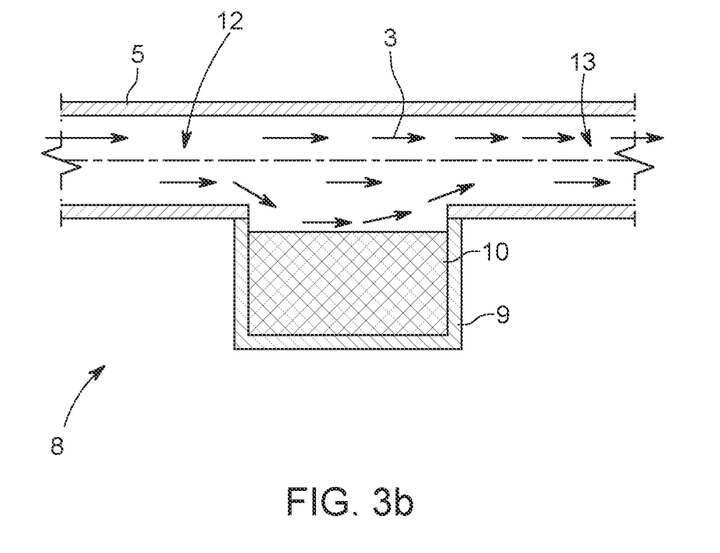
FIG. 3b a second embodiment of a device for deionizing the cooling liquid in the form of a container with mixed-bed resin arranged therein.
Figure 3C:
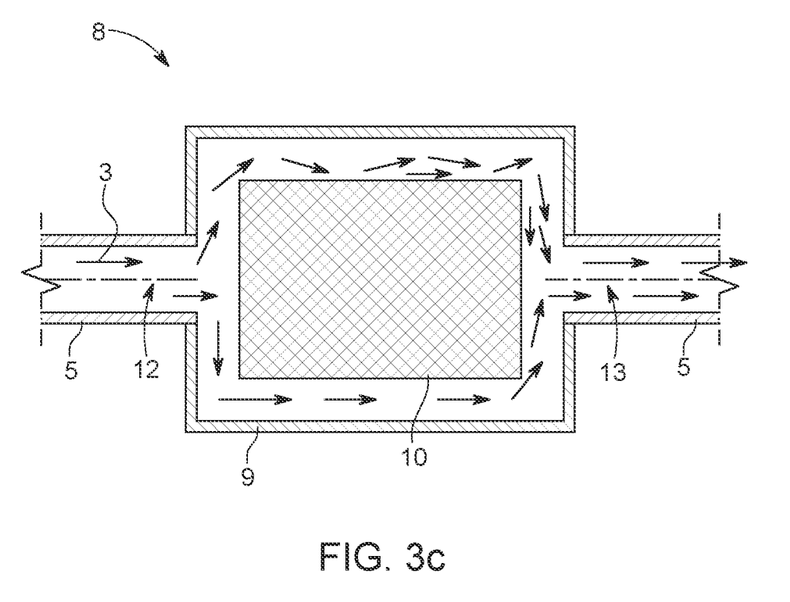
FIG. 3c a third embodiment of a device for deionizing the cooling liquid in the form of a container with mixed-bed resin arranged therein.

FIGS. 3b and 3c show two further possible embodiments of the deionizing device 8, in which the cooling liquid 3 in the container 9 in each case flows past the mixed-bed resin 10 in contact with the surface.

Figure 3D:
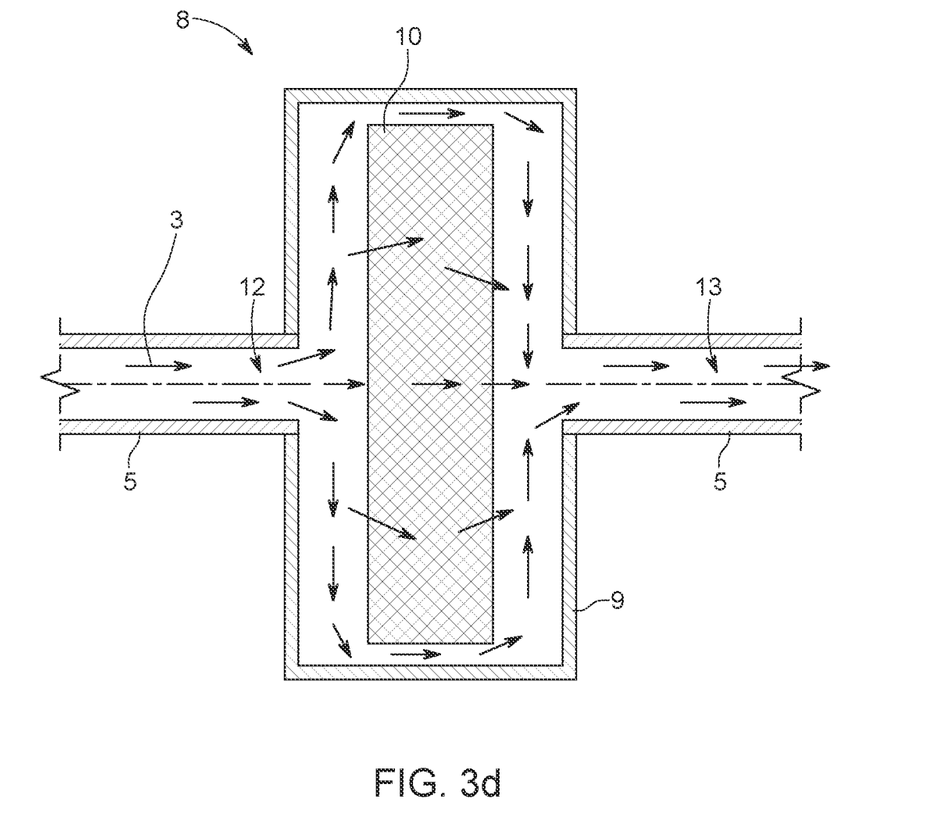
FIG. 3d a fourth embodiment of a device for deionizing the cooling liquid in the form of a container with mixed-bed resin arranged therein.

FIG. 3d shows a further possible embodiment of the deionizing device 8, wherein the cooling liquid 3 on the one hand flows through the mixed-bed resin 10 in the container 9 and/or on the other hand can flow past the mixed bed resin 10 only in contact with the surface.

Figure 4:
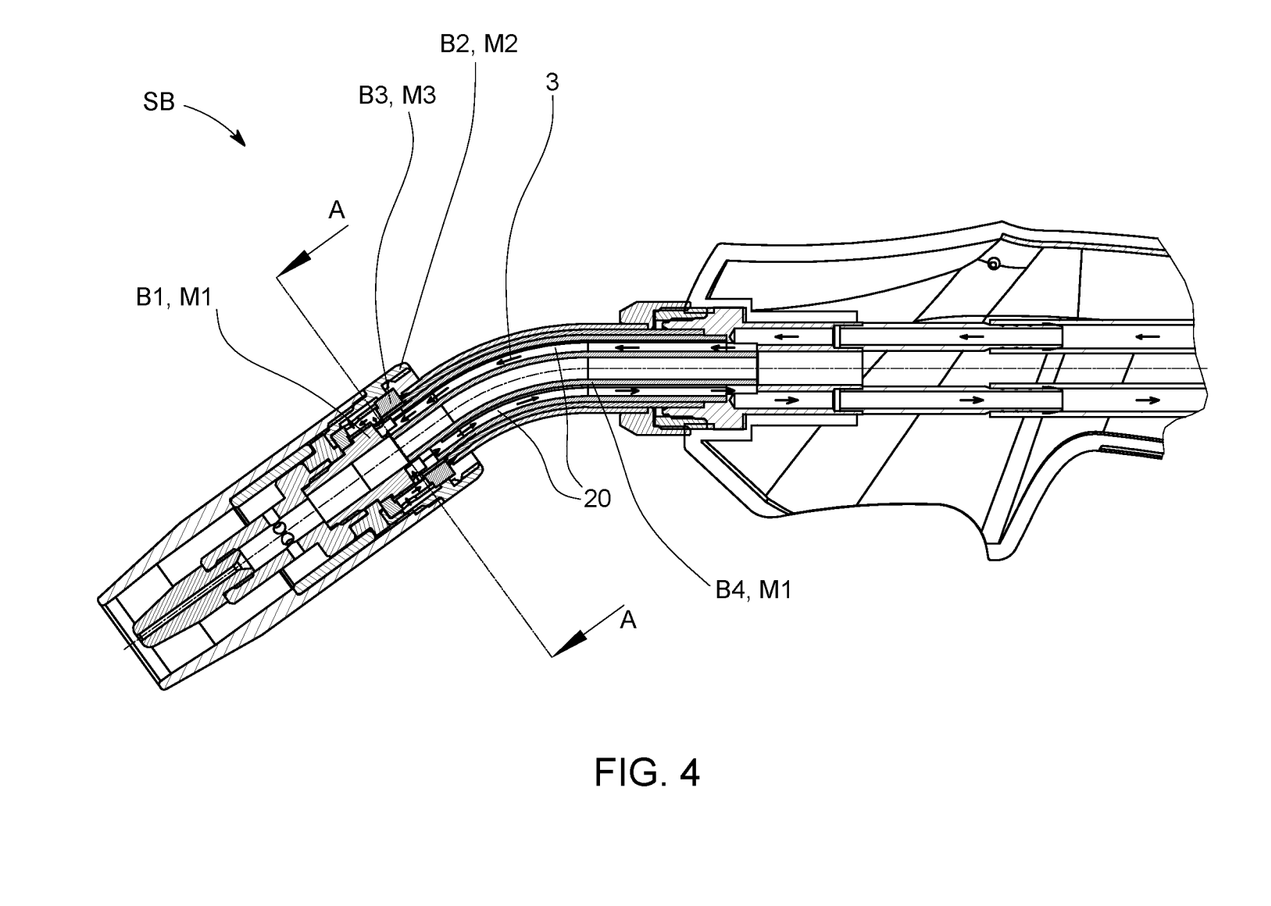
FIG. 4 a schematic cross-sectional view of a welding torch for connection to a welding component cooling system according to the invention.

FIG. 4 shows a schematic cross-sectional view of a welding torch SB for connection to a welding component cooling system 1 according to the invention. The welding torch SB has various components B1, B2, B3, B4, such as the nozzle block holder as component B1, the gas nozzle holder as component B2, the cooling sleeve as component B3, the inner tube of the pipe bend as component B4, etc. In the illustrated exemplary embodiment, the components B1 and B4 consist of an electrically conductive material M1 and the component B3 consists of another electrically conductive material M2. Component B3 consists of electrically insulating material M3. Within the welding torch SB, a cooling channel 20 extends for conveying a cooling liquid 3, said cooling channel being connected to the welding component cooling system 1 described above. The cooling channel 20 is partially formed by the above-mentioned components B1, B2, B3, B4 of the welding torch SB. In addition, the components B1, B2, B3, B4 are connected to each other, for example by means of a positive fit, a force fit or a material connection. Thus, an electrochemical cell is formed via the cooling liquid 3 flowing in the cooling channel 20. In a process promoted by a cooling liquid 3 with a high electrical conductivity S, the anode becomes electrochemically oxidized (sacrificial anode), which leads to the destruction of the affected components B1 and/or B2 and/or B4 of the welding torch SB made of the electrically conductive materials M1 and M2.

Since the cooling liquid 3 is deionized according to the invention and has a very low electrical conductivity S, different electrically conductive materials M1, M2, for which the standard potentials of the electrochemical voltage series differ by more than 0.7 V, can be used for the components B1, B2, B4 of the welding torch SB. As mentioned above, for example, aluminium (standard potential −1.66 V) can be combined with silver (standard potential +0.8 V), which was not possible with conventional water-cooled welding components SK.

Figure 5:
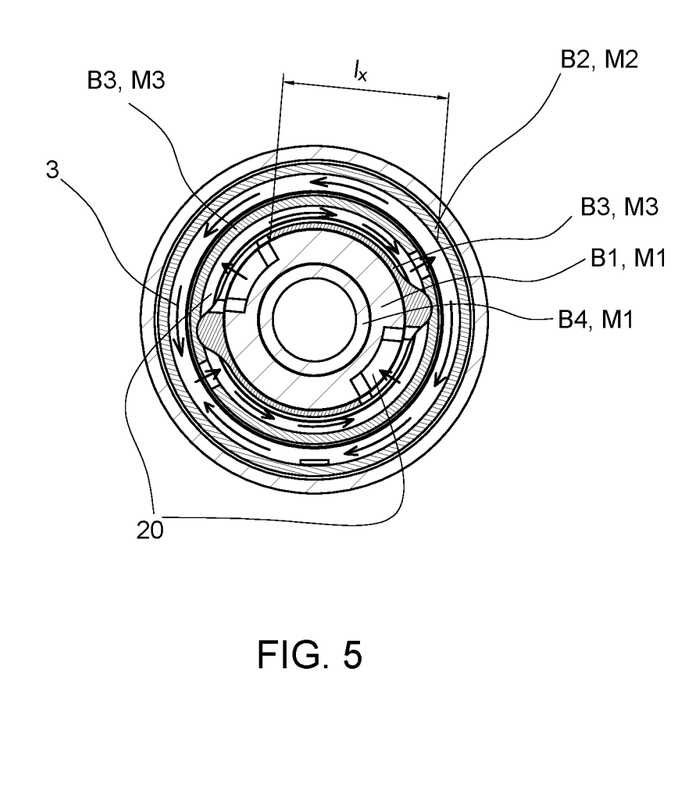
FIG. 5 a detailed view of a welding torch in the sectional view A-A to illustrate the components in the region of the cooling channel.

Finally, FIG. 5 shows a detailed view of the welding torch SB according to FIG. 5 along the cutting line A-A to illustrate the components B1, B2, B3, B4 in the area of the cooling channel 20. According to the invention, the electrically conductive components B1, B2, B4 of the welding torch SB are arranged in such a way that the minimum path length or fluid column length $l_{min}$ between the components B1 or B4 having the component B2, through the cooling channel 20 is less than 12 mm, preferably less than 5 mm. The distance $l_x$ indicated in FIG. 5 shows the distance to be traversed by the cooling liquid 3, wherein the distance $l_x$ indicated is virtually the same as the linear distance, in other words the actual liquid column length lmin is significantly longer than the distance $l_x$ drawn in FIG. 5 due to the design of the cooling channel 20—the cooling liquid 3 follows the cooling channel 20 and thus forms a flow curve. The production of a welding torch SB with a liquid column length 1 min mentioned above of less than 12 mm, preferably less than 5 mm, was not possible with the use of conventional cooling liquids 3.

The present invention improves the cooling of the welding components SK and their service life and, as described using FIGS. 4 and 5, enables the use of new materials and material combinations for the components of the welding components SK as well as new designs.

The invention claimed is:

1. A welding component cooling system for cooling a welding component, in particular a welding torch, comprising at least one container for cooling liquid, a cooling circuit with corresponding cooling lines, at least one pump arranged in the cooling circuit for conveying the cooling liquid through the cooling lines in the cooling circuit, and at least one heat exchanger arranged in a cooling line of the cooling lines, wherein a device for deionizing the cooling liquid is provided in the cooling circuit, wherein at least one sensor for measuring a conductance and at least one temperature sensor for measuring the temperature of the cooling liquid is arranged in the cooling circuit as well as at least one sensor for measuring the flow rate of the cooling liquid in the cooling circuit and connected in each case to a control device, the control device being connected to a welding current source connected to the welding component.

2. The welding component cooling system according to claim 1, wherein the deionizing device is formed by a container with a mixed-bed resin arranged therein.

3. The welding component cooling system according to claim 2, wherein the mixed-bed resin comprises a mixture of cation resin and anion resin.

4. The welding component cooling system according to claim 3, wherein the mixture of cation resin and anion resin comprises 40% cation salt and 60% anion salt.

5. The welding component cooling system according to claim 2, wherein the container with the mixed-bed resin has a central inlet channel and an external outlet channel coaxial thereto.

6. The welding component cooling system according to claim 1, wherein the deionizing device is arranged in a cooling line of the cooling lines within the cooling circuit.

7. The welding component cooling system according to claim 1, wherein the deionizing device is arranged in a bypass to a cooling line of the cooling lines within the cooling circuit.

8. The welding component cooling system according to claim 1, wherein at least one filter is arranged in the cooling circuit.

9. The welding component, in particular welding torch, comprising at least two components connected to each other made of at least two electrically conductive materials and a cooling channel for guiding a cooling liquid, which cooling channel is partially formed by the at least two components, wherein the welding component cooling system according to claim 1 is provided, the cooling circuit of which is connected to the cooling channel.

10. The welding component, in particular welding torch, according to claim 9, wherein the at least two components are formed of different electrically conductive materials, of which the standard potentials of the electrochemical voltage series differ by more than 0.7 V.

11. The welding component, in particular welding torch, according to claim 9, wherein the at least two components are arranged in such a way that a minimum path length between the components through the cooling channel is less than 12 mm.

12. The welding component according to claim 11, wherein the minimum path length between the components through the cooling channel is less than 5 mm.

* * * * *